(12) United States Patent  (10) Patent No.: US 7,971,366 B2
Seger et al.                 (45) Date of Patent:     Jul. 5, 2011

(54) ALIGNMENT TOOL

(76) Inventors: Christian David Seger, San Jose, CA (US); Stephen Mark Samuel, San Jose, CA (US)

( * ) Notice: Subject to any disclaimer, the term of this patent is extended or adjusted under 35 U.S.C. 154(b) by 0 days.

(21) Appl. No.: 12/589,476

(22) Filed: Oct. 22, 2009

(65) Prior Publication Data

US 2010/0186248 A1    Jul. 29, 2010

Related U.S. Application Data

(60) Provisional application No. 61/107,408, filed on Oct. 22, 2008.

(51) Int. Cl.
  B23Q 17/22    (2006.01)
  B23B 49/00    (2006.01)
  G01B 5/25     (2006.01)

(52) U.S. Cl. .......................................... 33/638

(58) Field of Classification Search .............. 33/638, 33/642
  See application file for complete search history.

(56) References Cited

U.S. PATENT DOCUMENTS

| | | | | |
|---|---|---|---|---|
| 1,141,396 A | * | 6/1915 | Jubinville | 33/642 |
| 2,074,990 A | * | 3/1937 | Roberts | 33/642 |
| 2,098,838 A | * | 11/1937 | Rusnak | 33/642 |
| 2,162,429 A | * | 6/1939 | Gruenke | 33/642 |
| 2,635,348 A | * | 4/1953 | Jones | 33/638 |
| 2,798,520 A | * | 7/1957 | Maskulka et al. | 408/241 G |
| 2,830,377 A | * | 4/1958 | Wenz | 33/638 |
| 2,890,607 A | * | 6/1959 | McLane | 408/72 R |
| 3,064,504 A | * | 11/1962 | Jarboe | 408/72 R |
| 3,079,694 A | * | 3/1963 | Yemmans | 33/642 |
| 3,336,677 A | * | 8/1967 | Newton | 33/638 |
| 3,601,897 A | * | 8/1971 | Muller | 33/642 |
| 3,763,570 A | * | 10/1973 | Andersen | 33/370 |
| 4,085,515 A | * | 4/1978 | Darden | 33/377 |
| 4,086,704 A | * | 5/1978 | Masaichi | 33/642 |
| 4,320,580 A | * | 3/1982 | Williams | 33/638 |
| 4,438,567 A | | 3/1984 | Raiha | |
| 4,566,202 A | | 1/1986 | Hamar | |
| 4,750,699 A | * | 6/1988 | Tingley | 248/278.1 |
| 5,245,759 A | * | 9/1993 | Pearson | 33/638 |
| 5,253,425 A | * | 10/1993 | Wozniak | 33/373 |
| 5,465,492 A | * | 11/1995 | Bond | 33/275 R |
| 6,375,395 B1 | | 4/2002 | Heintzeman | |
| 6,839,978 B2 | * | 1/2005 | Allen | 33/642 |
| 6,944,965 B1 | * | 9/2005 | Watamura | 33/642 |
| 7,758,288 B2 | * | 7/2010 | Takahashi | 408/201 |

* cited by examiner

*Primary Examiner* — Christopher W Fulton
(74) *Attorney, Agent, or Firm* — Schneck & Schneck; Thomas Schneck; David M. Schneck

(57) ABSTRACT

An alignment tool removably attachable to a bit (e.g. a drill bit) for aligning a workpiece to the bit. The tool has a bit grip or a bit clamp which may have a pair of bit grippers, an aligner, which may be a pointer supported by a pointer mount, a stylus or a laser, and a mechanical linkage of the bit grip to the aligner. When the aligner is aligned with a target, a tip of a bit clamped by the bit grip would also be aligned with that target. A first stylus link may be movably connected to a second stylus link at the pointer mount. The first and second stylus links may be pivotally connected to the bit clamp. The bit clamp, the first and second stylus links may cooperate to align a central axis of the pointer with a central axis of the bit.

12 Claims, 5 Drawing Sheets

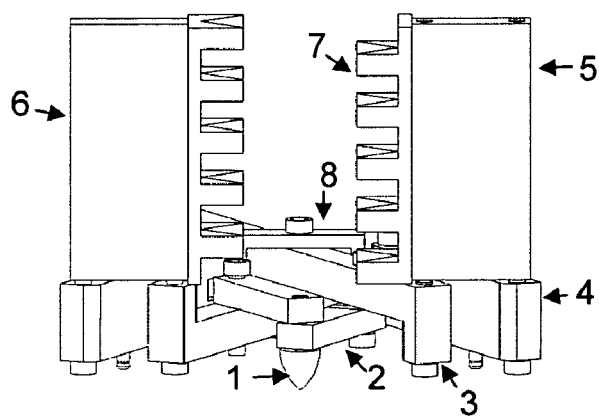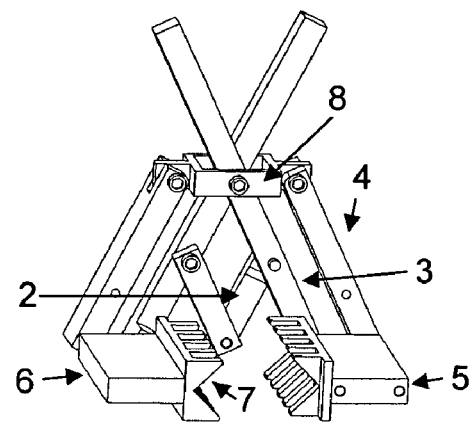
Fig. 1a
Fig. 1b

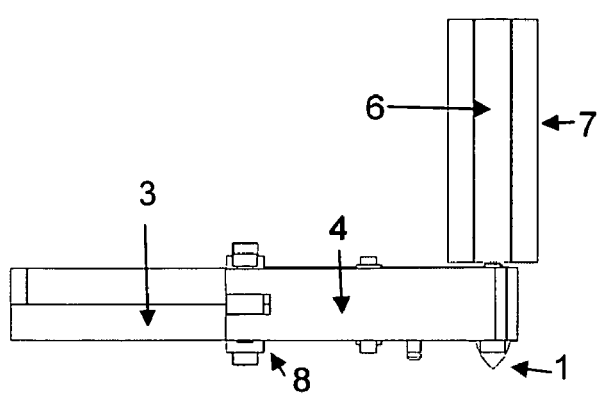
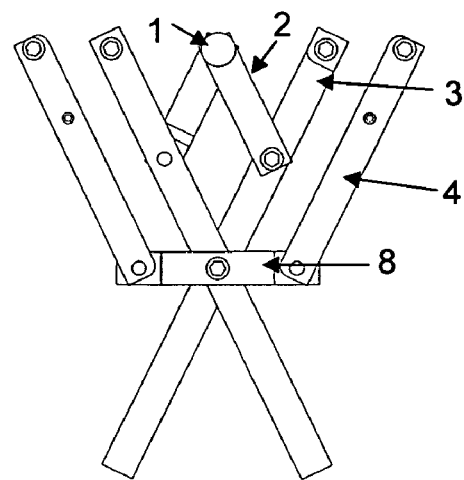
Fig. 2a
Fig. 2b

ALIGNMENT TOOL

CROSS-REFERENCE TO RELATED APPLICATION

This application claims priority from U.S. provisional application No. 61/107,408, filed Oct. 22, 2008.

TECHNICAL FIELD

The present invention relates to alignment tools for drill bits, milling machines and other machine tools that require accurate placement in relation to a workpiece.

BACKGROUND ART

When using high-speed drill bits and machine tools, it is difficult to place holes accurately due to the shape of the cutting end of bits. There exists no well-defined point on the end the cutting tool that a worker can place on the desired location on a workpiece. In addition, it is difficult to see where the bit is placed due to the fact that the diameter of the bit obscures the view of its center point, unless one's eye location is level with the plane to be drilled. This is especially difficult on a larger diameter bit.

Attempts have been made to solve this problem. Drill bits with a lower requirement for durability (such as wood cutting bits) have been made with finer points extending from the center of the bit. However, these bits cannot be used on harder materials because the center point does not last, rendering the bit inaccurate and possibly dangerous to use.

SUMMARY

An apparatus is provided to promote accurate placement of drilled and machined holes when using a drill press or manual-milling machine. The alignment apparatus works by quickly and easily clamping onto a bit in such a way that a stylus on the apparatus lines up with the centerline of the bit. The stylus has a sharp point that allows the operator to align the workpiece such that the center line of the bit is directly above whatever mark is on the workpiece. Once the workpiece is clamped in place, the operator removes the apparatus then drills an accurately placed hole.

The alignment apparatus has a bit grip, an aligner and a mechanical linkage of the bit grip to the aligner. When the aligner is aligned with a target, a tip of a bit clamped by the bit grip would also be aligned with that target.

In an embodiment, the alignment apparatus is an alignment tool. The alignment tool has a bit clamp with opposed first and second bit grippers. The alignment tool has a pointer, supported by a pointer mount. The alignment tool has a first stylus link movably connected to a second stylus link at the pointer mount. The first and second stylus links are pivotally connected to the bit clamp. The first and second bit grippers are manipulable to clamp to a bit. The bit clamp, the first and second stylus links cooperate to align a central axis of the pointer with a central axis of the bit.

In a further embodiment, the alignment tool is used for accurate placement of a bit in relation to a workpiece. The alignment tool has a jointed mechanical linkage with a pair of stylus links and a pair of handle links. The jointed mechanical linkage forms an extensible rhombus framework connected by pin joints. The handle links extend beyond the framework. The mechanical linkage also has a pair of gripper alignment links extending parallel to the handle links. The alignment tool has a pair of grippers. Each gripper connects, with pin joints, between a forward end of one of the gripper alignment links and a forward end of one of the handle links. Each gripper has angled faces extending upward from a plane of the mechanical linkage. The angled faces of the grippers are for holding a bit to be aligned with a workpiece. The alignment tool has an aligner located on a bottom of a pin joint connecting forward ends of the stylus links. All of the pin joints for the forward ends of the stylus links, handle links and gripper alignment links are in a line such that the pair of grippers can hold a center point of the bit to be aligned directly above the aligner.

BRIEF DESCRIPTION OF THE DRAWINGS

FIG. 1a is a front-end view of an embodiment of an alignment tool in accord with the present invention.

FIG. 1b is a top plan view of the alignment tool in FIG. 1a.

FIG. 2a is a right-side view of the alignment tool in FIG. 1a, with a laser substituted for the stylus.

FIG. 2b is a top plan view of the alignment tool as in FIG. 1b, but with the grippers removed.

FIG. 3b is a perspective view of grippers for use in the alignment tool in FIG. 1a.

Figure 3A:
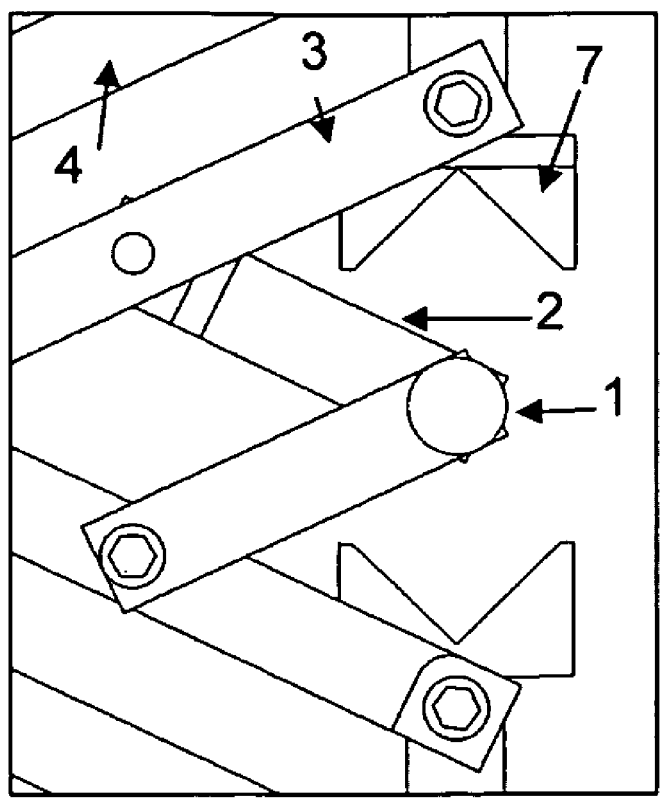
FIG. 3a is a close-up bottom view of the alignment tool in FIG. 1a, showing the relation of the stylus to the grippers.

The following reference numerals are used in FIGS. 1a through 5:

1: Stylus
2: Stylus links (2)
3: Handle links (2)
4: Gripper alignment links (2)
5: Gripper back A
6: Gripper back B
7: Grippers (2)
8: Pivot link
9: Spring
10: Drill Bit
11: Laser

DETAILED DESCRIPTION

With reference to FIGS. 1a and 1b, an alignment tool (100) is herein described. A drill bit, milling bit or other machining bit is installed in the chuck or other machining fixture of a drill press, milling machine or other metalworking, woodworking or materials-working machine (not shown). A workpiece, such as a piece of metal or wood suited to the type of machine, is secured to the materials-working machine in a manner appropriate to the machine, as known in the art. By manipulating appropriate adjustments on the materials-working machine, the workpiece may be roughly or approximately aligned with the bit. For precision alignment, the alignment tool (100) is then attached to the bit. The positioning of the workpiece relative to the bit is adjusted, so that the workpiece lines up with the alignment tool and thereby lines up with the bit.

To attach the alignment tool (100) to the bit, an operator or other personnel manually separates the grippers (7) sufficiently to accommodate the bit. The grippers (7) are then positioned longitudinally along the bit, near the tip of the bit, with a pointer such as the stylus (1) of the alignment tool (100) extending past the tip of the bit. The grippers (7) are clamped onto the bit, removably securing the alignment tool (100) to the bit. A pointed tip of the stylus, and a longitudinal center axis of the stylus extending through the pointed tip of the stylus, align with a longitudinal center axis of the bit. Thus, the pointed tip of the stylus aligns with the center axis and tip of the bit. The workpiece is then adjusted, using positioning and alignment adjustments of the materials-working machine, so that the workpiece contacts or is close to the pointed tip of the stylus, in an orientation and alignment with the bit as determined by the operator. The pointed tip of the stylus indicates a point of contact the bit will make with the workpiece, as the bit is moved through linear travel using the controls of the materials-working machine. The alignment tool (100) is removed after alignment is complete and prior to operating the materials-working machine to rotate the bit for materials removal.

As an example, an operator installs a drill bit in a drill press. The operator clamps the alignment tool (100) onto the drill bit, with the stylus (1) projecting forward from the alignment tool and the tip of the drill bit. The operator attaches the workpiece to the drill press, and aligns the workpiece with the stylus (1). The operator removes the alignment tool (100), and activates the motor that spins the drill bit. Using controls of the drill press, the operator begins drilling the material. The drill press moves the drill bit linearly towards the piece of metal or wood, and the drill bit makes contact with the material at the point previously indicated by the pointed tip of the stylus. Alignment of a lathe or a milling machine bit with a workpiece proceeds in a similar manner.

With reference to FIG. 1a, a drill press with a vertical orientation of a drill bit and vertical travel of the drill bit uses the alignment tool (100) with the grippers (7) and stylus (1) in a vertical orientation, and the mechanical linkage of the alignment tool (100) in a horizontal orientation. In such an orientation, with the drill bit pointing downward, the stylus (1) likewise points downward, acting as an aligned extension of the drill bit when the alignment tool (100) is clamped to the drill bit. In an embodiment, the grippers (7) may have interleaving sections for gripping a small diameter drill bit. The grippers (7) may have a "V"-shaped cross-section, or another angular, flattened, or curved cross-section may be used. The grippers (7) have a centering action on a drill bit as the grippers are clamped to the drill bit, so that the drill bit and the grippers are maintained in a known, repeatable relationship each time the alignment tool (100) is used.

With reference to FIG. 1b, a drill press with a horizontal orientation of a drill bit and horizontal travel of the drill bit uses the alignment tool (100) with the grippers (7) and stylus (1) in a horizontal orientation, and the mechanical linkage of the alignment tool (100) in a vertical orientation. In such an orientation, with the drill bit pointing horizontally, the stylus (1) likewise points horizontally.

In operation, the grippers (7) may be separated by a user grasping the gripper back A (5) and the gripper back B (6) and pulling the grippers (7) apart. Extensions of the handle links (3) may also be grasped and separated in order to separate the grippers (7). Other parts of the apparatus may be grasped and manipulated in order to separate the grippers (7).

The grippers (7) are part of a bit clamp, designed to clamp to a bit. The stylus (1) is a pointer supported by a pointer mount attached to the bit clamp. The grippers (7) and the pointer extend from the bit clamp in opposing directions.

A jointed mechanical linkage keeps gripper back A (5) and gripper back B (6) parallel to each other, although the grippers (7) may skew with respect to each other when not clamped to a bit. The jointed mechanical linkage keeps the stylus (1) half way between the grippers (7), whether the grippers (7) are aligned with each other or skewed. When the grippers (7) grasp a bit, the self-centering action, due to the faces of the grippers (7) as applied to the bit, ensures the grippers (7) align with each other, and the gripper back A (5) and gripper back B (6) form a straight line. The stylus (1), always halfway between the grippers (7), is then aligned with the gripper back A (5) and gripper back B (6). Thereby, the stylus (1) is aligned with the center line of the bit to which the grippers (7) are clamped.

Pin joints connect various pieces of the mechanical linkage, although other types of joints known in the art may be employed. A parallelogram is formed by gripper back A (5), a handle link (3), a portion of the pivot link (8) and a gripper alignment link (4), the pieces being pivotally connected by pin joints. The parallelogram ensures that the pivot link (8) and the gripper back A (5) remain parallel throughout the range of motion and operation of the alignment tool (100).

A similar, reflected parallelogram is formed by gripper back B (6), another handle link (3), another portion of the pivot link (8) and another gripper alignment link (4), the pieces being pivotally connected by pin joints. The similar parallelogram ensures that the pivot link (8) and the gripper back B (6) remain parallel throughout the range of motion and operation of the alignment tool (100). Thus, the gripper back A (5) and the gripper back B (6), both of which are parallel to the pivot link (8), remain parallel to each other throughout the range of motion and operation of the alignment tool (100). The pivot link (8) is pivotally connected at a midpoint to the pin joint connecting the handle links (3).

When the grippers (7) are clamped and self-centered to a bit, the parallelogram and the similar parallelogram are mirror-image congruent. A stylus link (2) is attached at one end with a pin joint to a midpoint of the handle link (3) associated with the gripper back A (5). The midpoint of the handle link (3) is halfway between the pin joint connecting the handle link (3) to the pivot link (8) and the pin joint connecting the handle link (3) to the gripper back A (5). The length of the stylus link (2), between pin joints, is equal to either the distance from the midpoint of the handle link (3) to the pin joint at the pivot link (8) or the distance from the midpoint of the handle link (3) to the pin joint at the gripper back A (5). Similar dimensions and attachments at pin joints apply to another stylus link (2) and another handle link (3) associated with the gripper back B (6). The one stylus link (2) is attached to the other stylus link (2) by a pin joint supporting the stylus (1). The two handle links (3) are attached to each other and to the pivot link (8) by a pin joint through a center of the pivot link (8). Thus, an equilateral parallelogram or rhombus is formed by the two stylus links (2) and portions of the two handle links (3), with the stylus (1) at one vertex and the center of the pivot link (8) at an opposing vertex of the rhombus.

Geometrical analysis shows congruent triangles are formed by the stylus links (2) and the handle links (3), with pin joints acting as vertices of the congruent triangles. The distance from the pin joint at the stylus (1) to the pin joint at the junction of the gripper back A (5) and the handle link (3) is the same as the distance from the pin joint at the stylus (1) to the pin joint at the junction of the gripper back B (6) and the other handle link (3). Thus, it can be deduced geometrically that the stylus (1) is always halfway between the pin joints connecting handle links (3) and gripper backs (5 and 6), as described previously. With a bit centered between the grippers (7), and the stylus halfway between the grippers (7), the tip and central axis of the stylus aligns with the central axis of the bit.

With reference to FIG. 2a, a laser (11) is seen, in place of the stylus, extending below the mechanical linkage, while the grippers (7) extend perpendicularly above the mechanical linkage, with the alignment tool (100) oriented for application to a vertical drill press. Relative thicknesses of various pieces may be observed, although other arrangements may be devised by a person skilled in the art. The laser or the stylus acts as a pointer.

With reference to FIG. 2b, the geometrical relationships of the various pieces of the mechanical linkage may be determined with the pieces laid flat.

With reference to FIG. 3a, the relative positions of the grippers (7) and the stylus (1), and the geometrical relationships among the portions of the mechanical linkage associated with these pieces are observed. A stylus link (2) is movably connected to another stylus link (2) at the pointer mount. The stylus links (2) are pivotally connected to the handle links (3) of the bit clamp. The grippers (7) are manipulable to clamp to a bit. The stylus links (2) and the bit clamp cooperate to align a central axis of the pointer with a central axis of the bit.

Figure 3B:
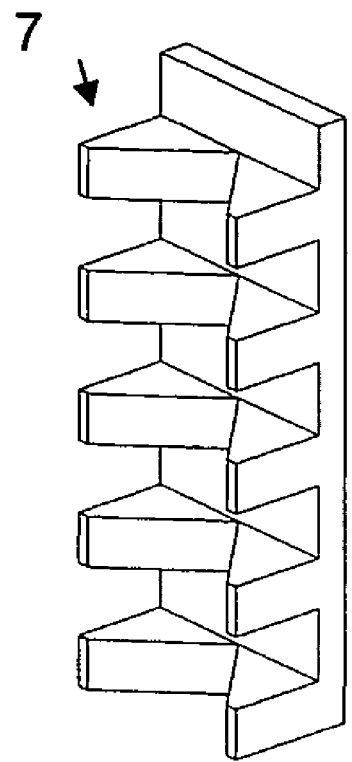

With reference to FIG. 3b, angled faces of a gripper (7) may be dimensioned for interleaving with another gripper (7). Grippers without interleaving may also be used.

Figure 4A:
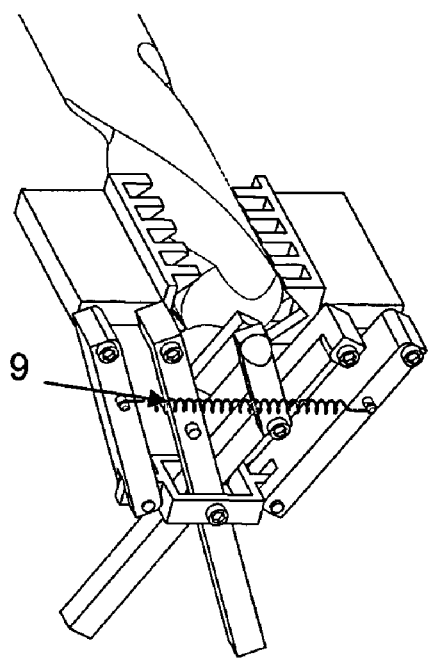
FIGS. 4a and 4b are perspective views from slightly below of an alignment tool as in FIG. 1a engaging a drill bit, and also showing a spring for loading the alignment tool.

With reference to FIG. 4a, the alignment tool (100) may have a spring or other clamping-force mechanism. The spring (9) may be attached at various places and in a manner known in the art. The spring (9) exerts a force on the mechanical linkage and acts to press the grippers (7) towards each other, so that the grippers clamp onto a bit when the alignment tool (100) is in use.

Figure 4B:
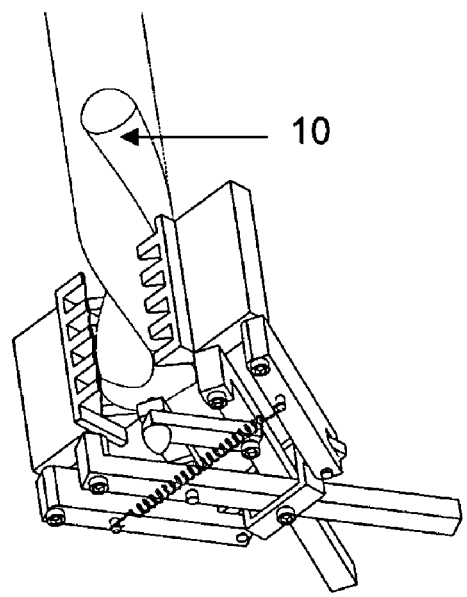

Using the linkage components shown as items 2, 3, 4 and 8 in FIGS. 1a through 3b, grippers (7) and a stylus (1) are positioned such that as the grippers open and close, the stylus (1) always lines up in the center. The jointed mechanical linkage forms a kind of extensible rhomboidal framework with revolute pin joints in the various lever arms (2, 3, 4, 8), similar to lazy tongs or a pantograph. The end joints of the stylus links (2), handle links (3) and gripper alignment links (4) to which the stylus (1) and grippers (7) attach are in a line. The operator opens up the spring-loaded linkage (9), wide enough to fit over the drill bit (10), as seen in FIGS. 4a and 4b. Once let go, the angled faces of the grippers (7) hold onto the outside diameter of the bit and the stylus (1) indicates the centerline of the drill bit (10).

Figure 5:
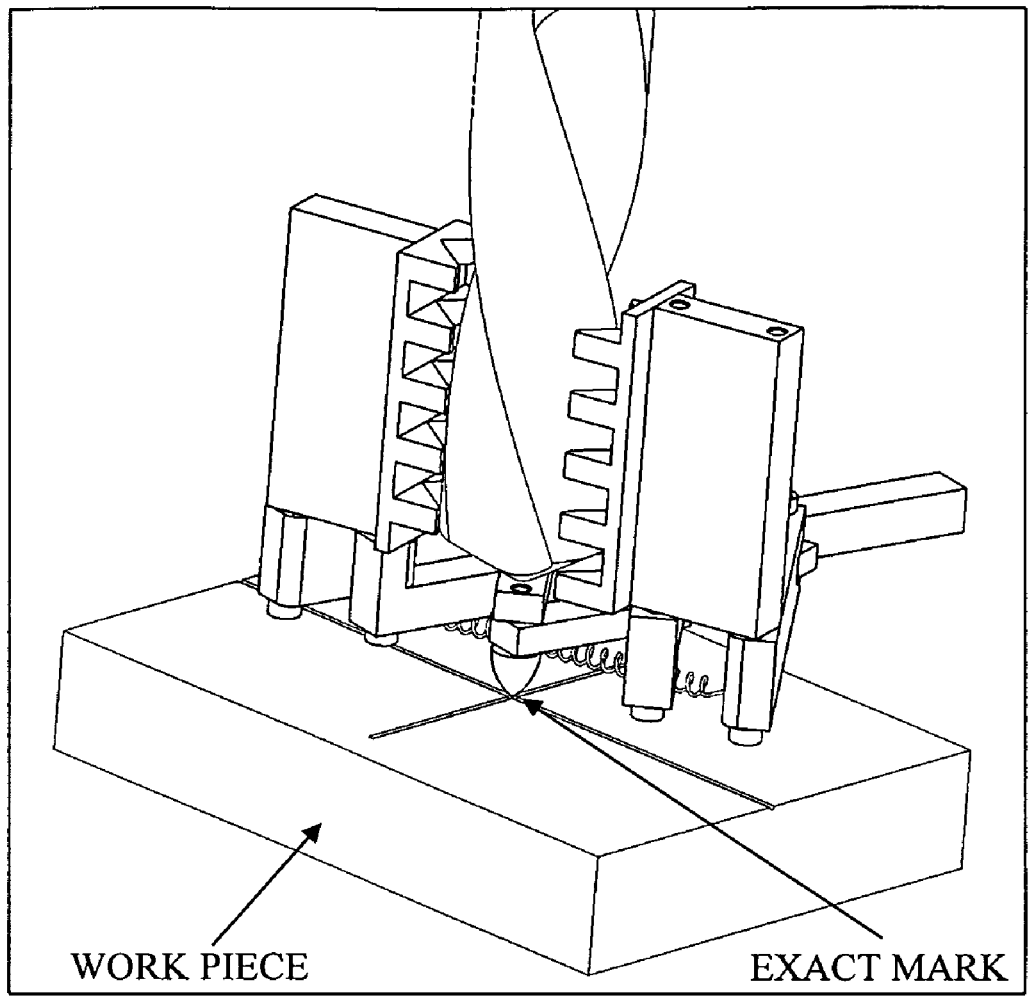
FIG. 5 is a perspective view from slightly above of an alignment tool engaging a drill bit as in FIGS. 4a and 4b, showing a relation of the stylus of the alignment tool to a mark on a workpiece to be drilled.

FIG. 5 shows how the stylus (1) indicates the exact location where the hole is to be drilled into the workpiece. As an alternative, a laser could replace the stylus (1) for optical alignment to a mark on the workpiece. The laser is positioned to produce a laser beam along the central axis of the pointer. Whereas a stylus (1) provides a physical pointer for aligning the bit to the workpiece, a laser provides an optical pointer for aligning the bit to the workpiece. Other tools, such as for milling, could be aligned in a manner similar to that of the drill bit (10).

Other linkages or frameworks for maintaining a pointer midway between two or more grippers, the grippers able to grip a bit and the pointer aligning with the centerline of the bit, may be devised by a person skilled in the art. Other types of pointers may be used. Various materials and shapes of grippers may be used.

The alignment tool (100) is an attachable, removable tool for aligning a workpiece to a drill bit or other tool bit. The alignment tool (100) is attached to the drill bit, the workpiece is aligned with a pointer of the alignment tool (100), and the alignment tool (100) is detached from the drill bit. In this manner, a workpiece may be aligned with a bit, even a large diameter drill bit or a drill bit having a tip dulled from use.

What is claimed is:

1. An alignment apparatus, comprising:
   a bit grip;
   an aligner; and
   a mechanical linkage of the bit grip to the aligner such that when the aligner is aligned with a target, a tip of a bit clamped by the bit grip would also be aligned with that target, wherein the bit grip includes a pair of bit clamping faces extending upward from the mechanical linkage, wherein the bit clamping faces interleave.

2. An alignment apparatus, comprising:
   a bit grip;
   an aligner; and
   a mechanical linkage of the bit grip to the aligner such that when the aligner is aligned with a target, a tip of a bit clamped by the bit grip would also be aligned with that target and wherein the mechanical linkage includes a jointed framework constructed to maintain a known alignment relation between the bit grip and aligner.

3. An alignment tool, comprising:
   a bit clamp, having opposing first and second bit grippers;
   a pointer supported by a pointer mount; and
   a first stylus link movably connected to a second stylus link at the pointer mount, the first and second stylus links being pivotally connected to the bit clamp; wherein
   the first and second bit grippers are manipulable to clamp to a bit, the bit clamp, the first and second stylus links cooperating to align a central axis of the pointer with a central axis of the bit.

4. The alignment tool of claim 3, wherein:
   the pointer extends from the pointer mount perpendicularly to the first and second stylus links and has a pointed tip; and
   the first and second bit grippers extend from the bit clamp in a direction opposing the pointer extension.

5. The alignment tool of claim 3, further comprising:
   a spring acting on the bit clamp to press the first and second bit grippers towards each other.

6. The alignment tool of claim 3, wherein:
   the bit clamp includes a first handle link pivotally connected to a second handle link, the first handle link pivotally supporting the first bit gripper and the second handle link pivotally supporting the second bit gripper;
   the first stylus link is pivotally connected to the first handle link; and
   the second stylus link is pivotally connected to the second handle link.

7. The alignment tool of claim 6, wherein the bit clamp further includes:
   a pivot link pivotally connected at a mid-point to the pivotal connection of the first and second handle links;
   a first gripper alignment link parallel to the first handle link, pivotally connected to the pivot link and further pivotally supporting the first bit gripper; and
   a second gripper alignment link parallel to the second handle link, pivotally connected to the pivot link and further pivotally supporting the second bit gripper.

8. The alignment tool of claim 3, wherein the first and second bit grippers interleave.

9. An alignment tool for accurate placement of a bit in relation to a workpiece, comprising:
   a jointed mechanical linkage having a pair of stylus links and a pair of handle links forming an extensible rhombus framework connected by pin joints, with the handle links extending beyond the framework, the mechanical linkage further having a pair of gripper alignment links extending parallel to the handle links;

a pair of grippers, each gripper connecting with pin joints between a forward end of one of the gripper alignment links and a forward end of one of the handle links, each gripper further having angled faces extending upward from a plane of the mechanical linkage for holding a bit to be aligned with a workpiece; and an aligner located on a bottom of a pin joint connecting forward ends of the stylus links, all of the pin joints for forward ends of the stylus links, handle links and gripper alignment links being in a line such that the pair of grippers can hold a center point of the bit to be aligned directly above the aligner.

10. An alignment tool as in claim 9, wherein the aligner includes a stylus extending substantially perpendicularly below a plane of the mechanical linkage.

11. An alignment tool as in claim 9, wherein the mechanical linkage is spring loaded to hold the grippers in a closed relation around a bit.

12. The alignment tool of claim 9, wherein the angled faces of the grippers interleave.

\* \* \* \* \*